United States Patent [19]

Iwata et al.

[11] 4,053,907
[45] Oct. 11, 1977

[54] PROGRAM-CONTROLLED SHUTTER

[75] Inventors: Hiroshi Iwata, Osaka; Katsuji Ishikawa, Higashi, both of Japan

[73] Assignee: West Electric Co., Ltd., Japan

[21] Appl. No.: 621,819

[22] Filed: Oct. 14, 1975

[30] Foreign Application Priority Data

Oct. 18, 1974 Japan .................................. 49-120903
Oct. 18, 1974 Japan .................................. 49-120904

[51] Int. Cl.² .............................................. G03B 7/14
[52] U.S. Cl. ................................ 354/29; 354/23 D;
354/31; 354/49; 354/59; 354/60 A
[58] Field of Search .................. 354/23 D, 29, 31, 49,
354/59, 60 R, 60 A, 43, 44, 42

[56] References Cited
U.S. PATENT DOCUMENTS 3,900,855 8/1975 Stempeck .......................... 354/23 D
3,945,025 3/1976 Stempeck .......................... 354/23 D

*Primary Examiner*—Russell E. Adams
*Attorney, Agent, or Firm*—Burgess, Ryan and Wayne

[57] ABSTRACT

In exposure means comprising, in combination, two shutter blades which also function as the aperture setting blades, a step-motor for displacing the shutter blades stepwise in response to the driving pulse or pulses, and a driving circuit for the step-motor. Slits are cut through the shutter blades so that the relative displacement between the shutter blades may be optically detected in order to control the stepwise rotation of the step-motor, thereby displacing the shutter blades to define the main aperture stepwise; and when the light from a subject reaches a predetermined level, detecting means causes the step-motor to reverse its rotation, thereby closing the shutter blades. The program-controlled shutter in accordance with the present invention is very simple in construction and is free from any erratic operations.

9 Claims, 7 Drawing Figures

PROGRAM-CONTROLLED SHUTTER

BACKGROUND OF THE INVENTION

The present invention relates generally to a program-controlled shutter adapted to attain the optimum exposure depending upon the brightness of a subject, and more particularly a program-controlled shutter of the type in which a plurality of shutter blades which also function as the aperture setting blades are driven stepwise by a step-motor so that the optimum aperture may be set for the optimum time interval depending upon the brightness of a subject.

The program-controlled shutters of the type described above have been disclosed, for instance, in U.S. Pat. No. 3,882,522, U.S. Pat. No. 3,813,680 and the copending applications filed by the same inventors, Ser. Nos. 550,367 filed on Feb. 18th, 1975, 567,231 filed on Apr. 11th, 1975, and 569,006 filed on Apr. 17th, 1975. These prior art program-controlled shutters were devised in order to overcome the defects encountered in the prior art program-controlled shutters of the type using a moving coil or governor for controlling the shutter or aperture setting blades or diaphragms. That is, the prior art program-controlled shutters use a step-motor for driving stepwise the shutter or aperture setting blades or diaphragms. The common underlying principle of these program-controlled shutters is that the step-motor is rotated stepwise in response to the number of pulses which in turn are generated by a pulse generator in response to the brightness of a subject, whereby the aperture and shutter speed may be selected. Therefore if the shutter or aperture setting blades or diaphragms are not coupled to the step-motor with suitable mechanical coupling means which permits the smooth transmission of the driving power from the step-motor to the shutter or aperture setting blades or diaphragms or when the step-motor's response to the driving pulse is slow, the number of stepwise angular rotations of the steo-motor is different from the number of driving pulses applied thereto, resulting in the erratic exposure; that is, under- or over-exposure. Furthermore, since the prior art program-controlled shutters of the type described above must incorporate a control circuit for controlling the pulse generator, they are relatively complex in construction.

SUMMARY OF THE INVENTION

One of the objects of the present invention is therefore to provide a program-controlled shutter of the type in which exposure means consisting of a step-motor and shutter and aperture setting blades may be actuated in a very reliable and dependable manner without any erratic functions even without the use of a pulse generator.

Another object of the present invention is to provide a program-controlled shutter in which the electronic circuit is very simple in construction yet very reliable and dependable in operation.

The above and other objects, features and advantages of the present invention will become more apparent from the following description of the preferred embodiments thereof taken in conjunction with the accompanying drawing.

DESCRIPTION OF THE PREFERRED EMBODIMENTS

Figure 1A:
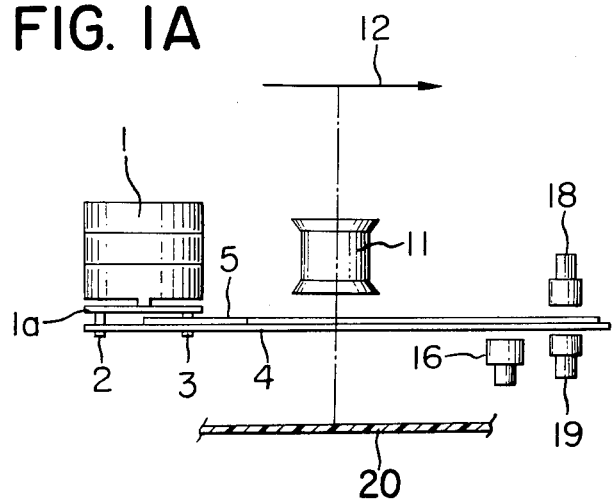
FIG. 1A is a schematic top view of exposure means consisting of a step-motor and two shutter aperture setting blades.
Figure 1B:
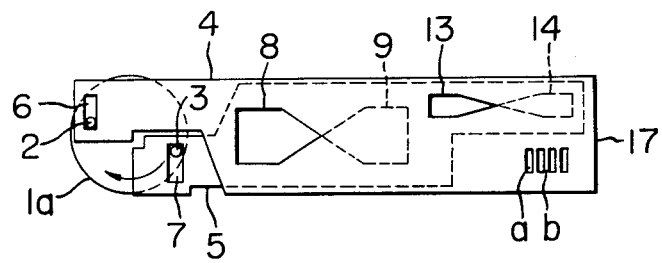
FIG. 1B is a schematic front view thereof showing the shutter and aperture setting blades in closed position.
Figure 1C:
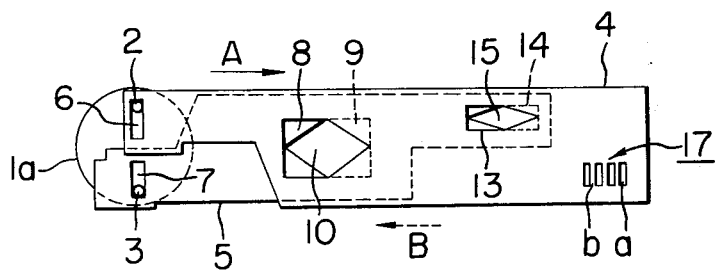
FIG. 1C is a view similar to FIG. 1B showing the shutter and aperture setting blades in operative position.
Figure 2:
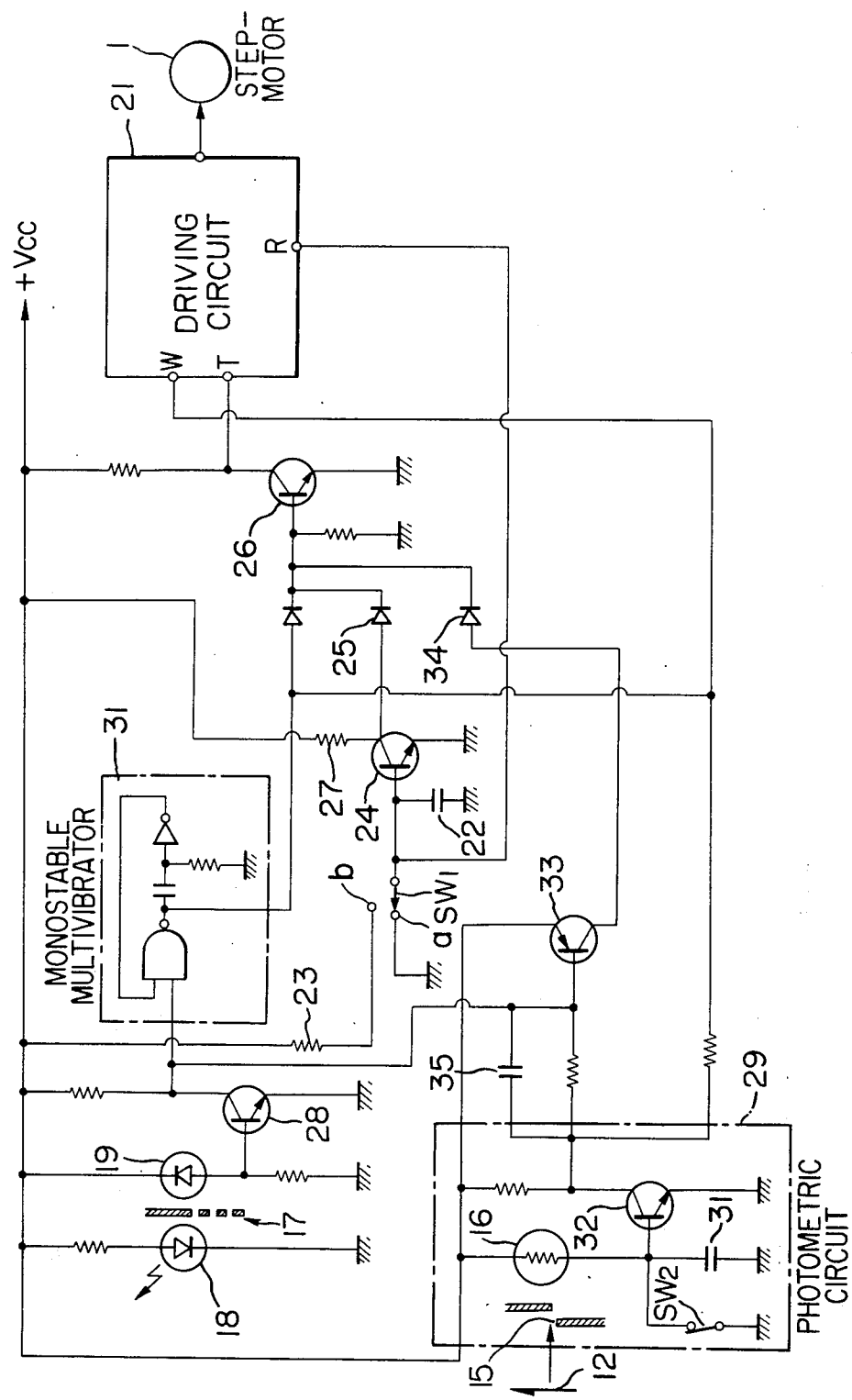
FIG. 2 is a diagram of an electronic control circuit of a first embodiment of the present invention.
Figure 3:
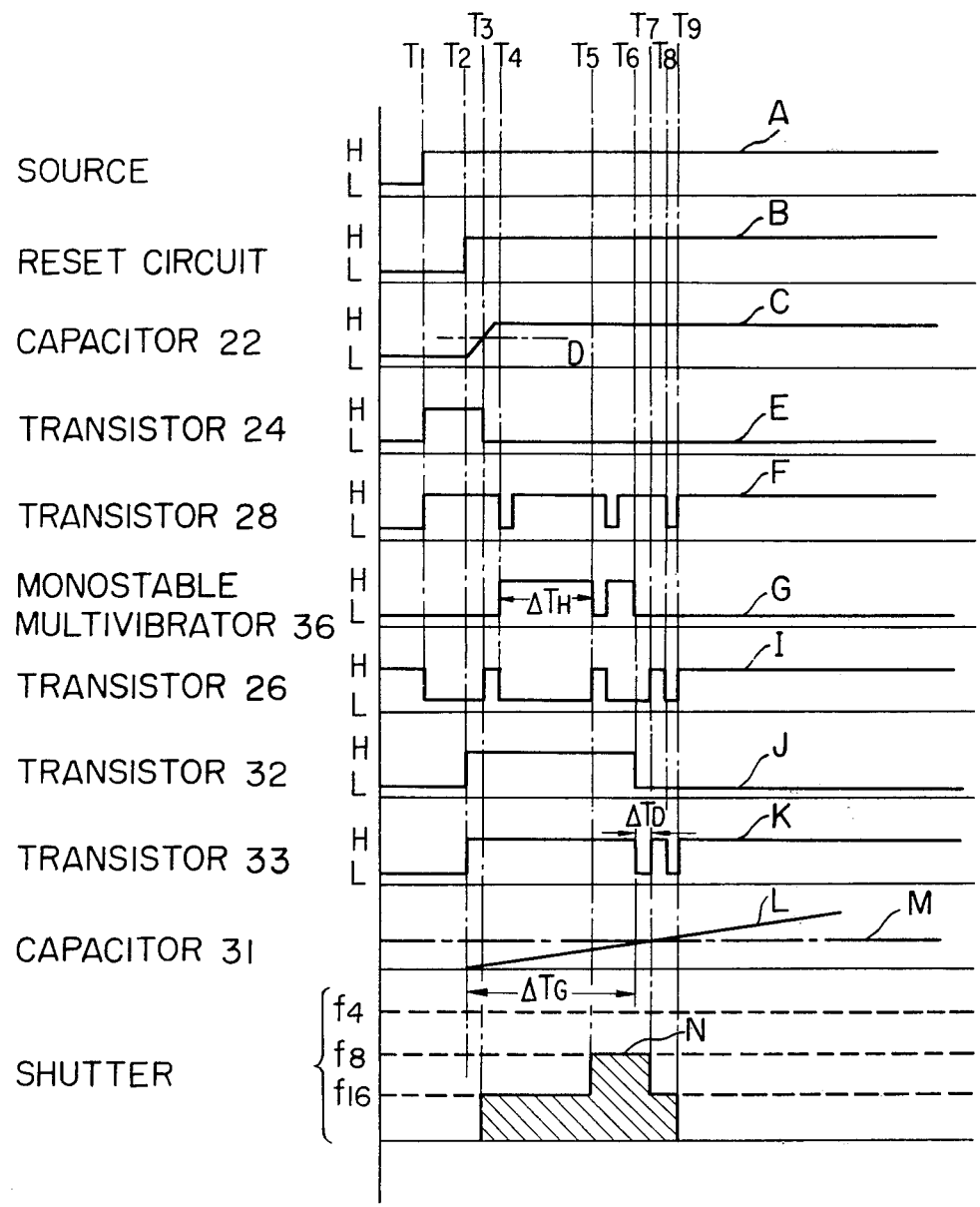
FIG. 3 is a time chart used for the explanation thereof.

First Embodiment, FIGS. 1 through 3

Referring to FIGS. 1A, 1B and 1C, a step-motor 1 is of the conventional type and rotates through an angle in proportion to the number of driving pulses received. Two driving pins 2 and 3 extend in parallel with the driving shaft of the step-motor 1 from a disk 1a attached to the shaft, and are loosely fitted into guide slots 6 and 7, respectively, of shutter blades 4 and 5. The shutter blades 4 and 5 have main openings 8 and 9 which define a main aperture 10 as will be described in detail hereinafter, auxiliary openings 13 and 14 which define the auxiliary aperture 15 (See FIG. 1C) as will be described in detail hereinafter, and gratings 17 each with a plurality of slits $a$ and opaque or light shielding spaces $b$ therebetween.

FIG. 1B shows the shutter blades 4 and 5 in the inoperative position; that is, when the shutter button (not shown) is not depressed, but when the step-motor 1 is rotated in the direction indicated by the arrow in FIG. 1B in response to the driving pulse or pulses applied thereto in a manner to be described in detail hereinafter, the shutter blades 4 and 5 are displaced in the opposite directions relative to each other as indicated by the arrows A and B in FIG. 1C so that the main and auxiliary openings 8 and 9 and 13 and 14 overlap to define the main and auxiliary apertures 10 and 15, respectively. As a result, a subject 12 is focused through a lens 11 and the main aperture 10 on a film 20 (See FIG. 1A), and the light from the subject 12 is intercepted through the auxiliary aperture 15 by a photocell 16 for the purpose to be described hereinafter. Since the step-motor 1 rotates through a predetermined angle in response to one driving pulse, the opening area of the main aperture 10 is increased stepwise. The increase in the opening area of the main aperture 10 in response to one driving pulse may be arbitrarily selected by suitably selecting the configuration of the main openings 8 and 9 and the configuration and position of the guide slots 6 and 7. In the instant embodiment, it is assumed that in response to one, two and three driving pulses applied to the step-motor 1, the shutter blades 4 and 5 are so displaced as to define the opening areas of the main aperture 10 corresponding to stopping down the lens to $f$-16, $f$-8 and $f$-4, respectively.

In like manner, the opening area of the auxiliary aperture 15 defined by the auxiliary openings 14 and 15 changes stepwise. That is, in the instant embodiment, the opening area is minimum when the main aperture 10 is closed while it is maximum when the main aperture 10 is wide open. The auxiliary aperture 15 is therefore provided in order to control the quantity of the light from the subject 12 to be intercepted by the photocell 16 in proportion to the opening area of the main aperture 10. As a result, the time constant of a photometric circuit including the photocell 16 to be described in detail hereinafter may be changed in response to the brightness of the subject 12.

The gratings 17 are provided in order to intermittently interrupt the light emitted from a light source 18 from being intercepted by a photocell 19 (See FIG. 1A) as the shutter blades 4 and 5 are displaced in the opposite directions, whereby pulse signals may be generated for the purpose to be described hereinafter. The gratings 17 are therefore to be sometimes referred to as "the signal-generating gratings" hereinafter in this specification. As described above, the signal-generating gratings 17 are provided in order to generate pulse signals so that instead of them any suitable signal generating means may be used. For instance, a plurality of permanent magnets may be attached on the shutter blade 4 in such a way that the opposite polarity poles S and N may be alternately arrayed while a suitable magnetic flux detecting element such as a Hall element may be attached to the shutter blade 5. Alternatively, a plurality of electrical contacts may be attached to the shutter blade 4 in suitably equidistantly spaced apart relation while a wiper or the like may be attached to the shutter blade 5 in such a way that it may be normally in contact with one of the contacts on the shutter blade 4. In both instances, the relative displacement between the shutter blades 4 and 5 may be detected magnetically and electrically.

Next referring to FIGS. 2 and 3, an electronic control circuit for controlling the rotation of the step-motor 1 for the optimum exposure in response to the brightness of the subject will be described. The control circuit includes a driving circuit 21 with an driving pulse input terminal T, a rotation reversal signal input terminal W and a reset terminal R. Since the driving circuit 21 is disclosed in detail in the above pending applications, the detailed description thereof shall not be made in this specification.

When the moveable contact of a switch $SW_1$ which is operatively interlocked with the shutter button (not shown) is switched from a stationary contact $a$ to $b$, a capacitor 22 is connected to a voltage supply Vcc whereby it is charged through a resistor 23. When the voltage across the cpaci tor 22 exceeds a threshold voltage of a transistor 24, the latter becomes conductive, so that the signal may be transmitted through a diode 25 to the base of a transistor 26. That is, as indicated at A in FIG. 3, the collector supply voltage Vcc is supplied from $T_1$, and the output from a reset circuit rises from a low level L to a high level H at $T_2$ when the switch $SW_1$ closed the contact $b$ as indicated by B in FIG. 3. From $T_2$ the charging of the capacitor 22 is started as indicated by C in FIG. 3, and when the voltage across it reaches a threshold value D at $T_3$, the transistor 24 becomes conductive. As a result, the voltage at the collector thereof drops from H level to L level as indicated by E in FIG. 3, and consequently the transistor 26 is turned off so that the voltage at the collector thereof rises to H level from L level as indicated by I in FIG. 3. The rise in voltage at the collector is transmitted and applied to the input terminal T of the driving circuit 21 so that the step-motor 1 rotates through a predetermined angle, causing the shutter blades 4 and 5 to displace, thereby defining the main aperture 10 corresponding to $f$-16 as indicated by N in FIG. 3.

The slits $a$ of the gratings 17 (See FIGS. 1A – 1C) are so arranged that when the step-motor 1 makes one step rotation, the light from the light source 18 may be intercepted by the photocell 19. Therefore at $R_4$, a transistor 28 becomes conductive, and the voltage drop at the collector thereof from H level to L level indicated by F in FIG. 3 is transmitted to a monostable multivibrator 36, so that the latter is driven into the quasi-stable state for a predetermined time $\Delta T_H$ as indicated by G in FIG. 3. As a result, during this interval $\Delta T_H$ the transistor 26 is kept conductive. At the trailing edge of the pulse with the duration of $\Delta T_H$; that is, at $T_5$, the transistor 26 becomes conductive again as indicated at I in FIG. 3 so that a second driving pulse is applied to the driving circuit 21. Therefore the step-motor 1 makes another stepwise rotation displacing the shutter blades 4 and 5 in the opposite directions so that the opening area of the main aperture 10 is increased stepwise to $f$-8 as indicated at N in FIG. 3. The time interval from the time when the main aperture 10 is opened to $f$-16 to the time when it is opened to $f$-8 is therefore almost but not precisely equal to the time constant $\Delta T_H$ of the monostable multivibrator 36. In like manner, the main aperture 10 may be opened to $f$-4.

However, when the signal from the photometric circuit 29 is transmitted to the driving circuit 21 in a manner to be described in detail hereinafter, the above shutter opening mode is reversed to the shutter closing mode. In the photometric circuit 29, the light from the subject 12 is intercepted through the auxiliary aperture 15 by the photocell 16 so that a timing capacitor 31 is charged as indicated by L in FIG. 3 as a switch $SW_2$ is opened when the shutter button is depressed. In the instant embodiment, it is assumed that it takes $\Delta T_G$ before the voltage across the timing capacitor 31 reaches a threshold value M of a transistor 32. That is, the collector voltage of the transistor 32 remained at H level from $T_2$ when the photometric circuit started the measurement of the brightness of the subject by the intergration of the incident light in terms of the voltage rise across the timing capacitor 31 to $T_6$ when the voltage across the timing capacitor 31 rises to the threshold value M so that the transistor 32 conducts. As a result, the output from the monostable multivibrator 36 drops from H level to L level at $T_6$.

The output from the transistor 32 is also applied to the terminal W of the driving circuit 21. That is, when the high (H) level output signal is applied to the terminal W, the step-motor 1 is rotated in such a direction that the main aperture 10 is opened, but when the low (L) level signal is applied, the rotation of the step-motor 1 is reversed so that the main aperture 10 may be closed. At $T_6$ the output from the transistor 32 drops from H level to L level so that the rotation of the step-motor 1 is reversed.

The L level output from a time-delay circuit consisting of a capacitor 35 and a transistor 33 is applied through a diode 34 to the base of the transistor 26 from $T_6$ to $T_7$, that is for a time interval of $\Delta T_D$ so that the generation of the driving pulse is suspended until $T_7$. That is, at $T_7$ the output from the transistor 33 rises from L level to H level so that the transistor 26 becomes non conductive and consequently the output from the transistor 26 rises from L level to H level at $T_7$ as indicated by I in FIG. 3. As a result, the driving pulse is applied to the driving circuit 21 so that the step-motor 1 is rotated one step in the opposite direction. Therefore, the shutter blades 4 and 5 are displaced one step toward their initial position, whereby the main aperture 10 is closed to $f$-16 as shown at N in FIG. 3.

As the shutter blades 4 and 5 are returned one step toward their initial position, the light from the light source 18 is intercepted through the aligned slits $a$ of the gratings 17 by the photocell 19 so that the transistor 28 conducts at $T_8$ as indicated at I in FIG. 3. As a result, the output from the transistor 33 drops to L level again as indicated at K in FIG. 3 so that the output from the transistor 26 also drops to L level. At $T_9$ the light interception by the photocell 19 is interrupted because the slits $a$ of the gratings are not aligned with each other. Then, the transistor 28 is turned off so that the output from the transistor 33 rises to H level. Consequently, the output from the transistor 26 rises to H level again. That is, the driving pulse is applied to the driving circuit 21 so that the step-motor 1 rotates one step in the opposite direction and consequently the main aperture 10 is completely closed. Thus, the exposure is completed.

As described above, according to the present invention the time when the shutter closing signal is generated changes depending upon the brightness of the subject so that the shutter blades 4 and 5 are closed after the lens is stopped down to $f$-8 or $f$-4. That is, the shutter opening time or shutter speed is changed in response to the opening area of the main aperture 10 so that the optimum exposure may be attained.

In the instant embodiment, the opening area of the main aperture 10 has been described as being increased in three steps to $f$-4 for the sake of explanation, but it will be understood that the opening area of the main aperture may be increased as many steps as desired so that the lens may be stopped down to a desired number of $f$-numbers or apertures. The modifications of the shutter blades and the electronic control circuit for this purpose are of course clear to those skilled in the art over the above description of the first embodiment.

Figure 4:
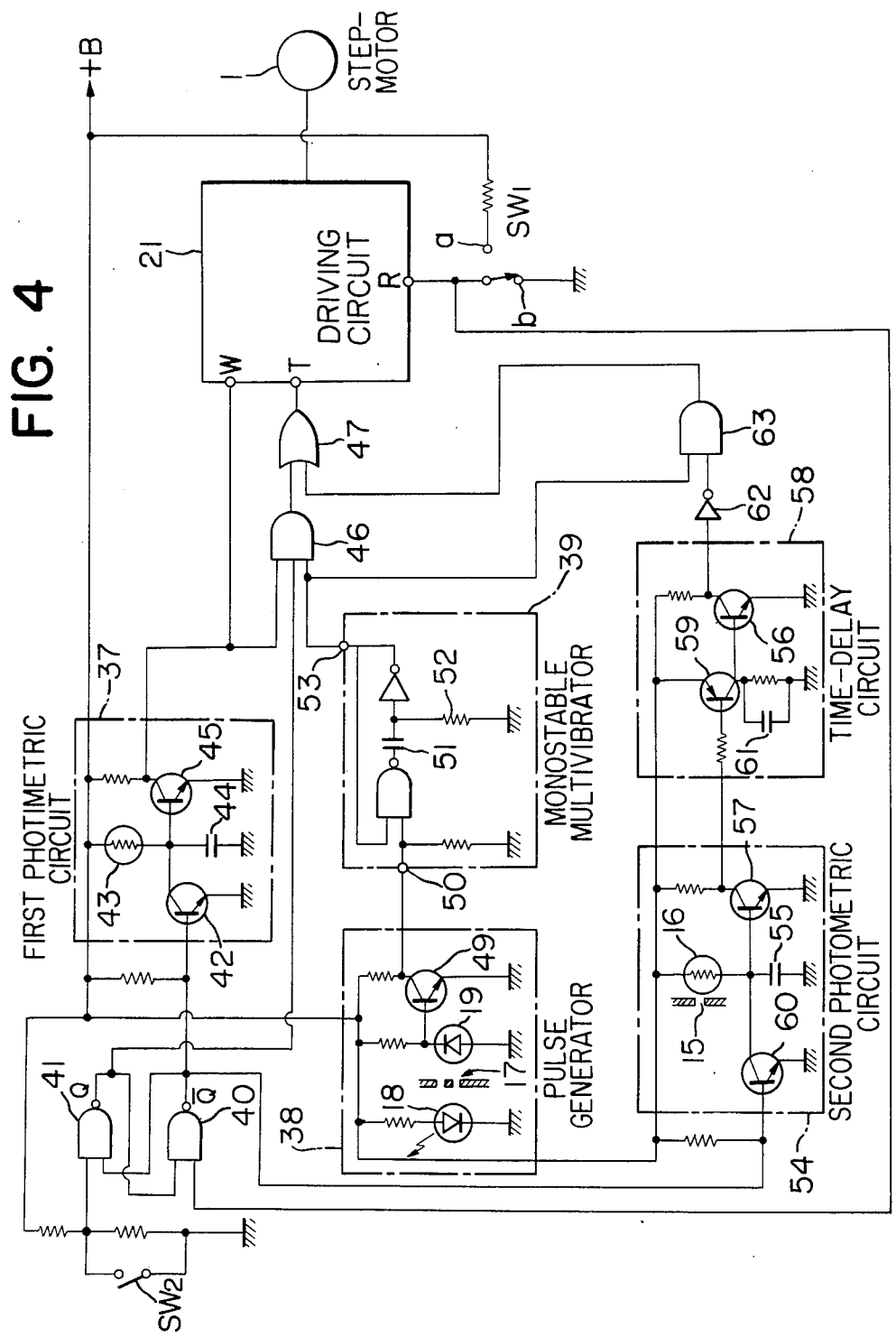
FIG. 4 is a diagram of an electronic control circuit of a second embodiment of the present invention.
Figure 5:
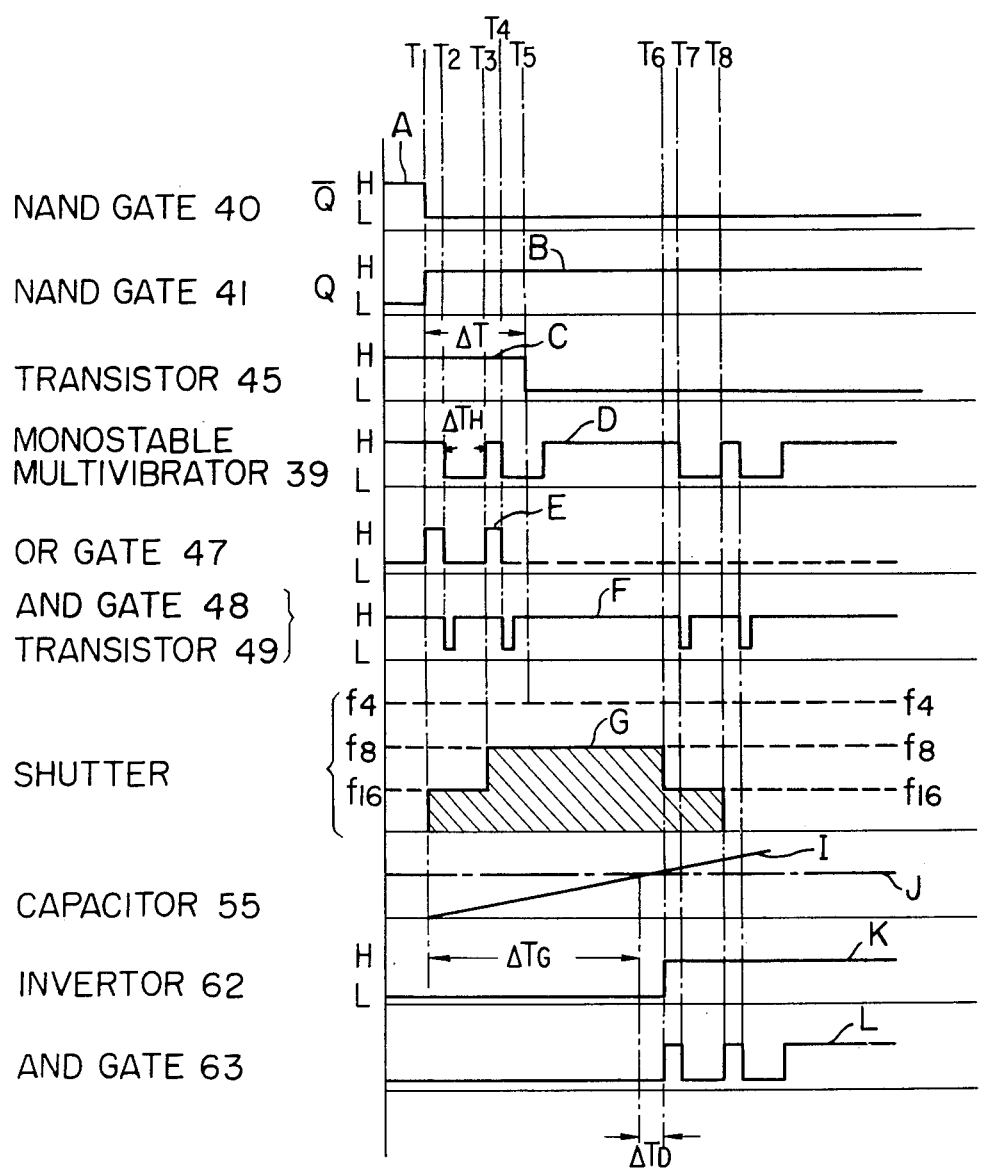
FIG. 5 is a time chart used for the explanation thereof.

Second Embodiment, FIGS. 4 and 5

Next referring to FIGS. 4 and 5, the second embodiment of the present invention will be described which is substantially similar in construction except an electronic control circuit.

As with the first embodiment when the shutter button (not shown) is depressed, the switch $SW_1$ closes the contact $a$ and the switch $SW_2$ is closed. At this time $T_1$, the output Q from a first NAND gate 40 drops from H level to L level as indicated at A in FIG. 5 so that a transistor 42 in a first photometric circuit 37 is turned off, so that the operation of the circuit 37 is started. That is, the light from the subject is intercepted by a photocell 43 so that a timing capacitor 44 is charged with the time constant depending upon the brightness of the subject. After a time interval $\Delta T$ from $T_1$ the voltage across the timing capacitor 44 rises to a threshold voltage of a transistor 45 so that the latter conducts. Consequently the voltage at the collector thereof drops from H level to L level as indicated at C in FIG. 5.

At $T_1$ the output Q of a second NAND gate rises from L level to H level as indicated at B in FIG. 5 while the output from a monostable multivibrator 39 remains at H level as indicated at D in FIG. 5. The outputs from the first photometric circuit 37, second NAND gate 41 and monostable multivibrator 39 are applied to an AND gate 46. At $T_1$ the output from the AND gate 46 is at H level as indicated at F in FIG. 5 since at $T_1$ the inputs thereto are at H level. The H level output from the AND gate 46 is applied through an OR gate 47 to the input terminal T of the driving circuit 21 as the driving pulse so that the step-motor 1 is rotated one step in one direction. At $T_1$ the H level output from the first photometric circuit 37 is also applied to the input terminal W of the driving circuit 21 so that the step-motor 1 may be rotated in the direction in which the shutter blades 4 and 5 are displaced to define the main aperture 10 in the manner described in conjunction with the first embodiment. On the other hand, when the L level output from the first photometric circuit 37 is applied to the input terminal W the step-motor 1 is rotated in the opposite direction in which the shutter blades 4 and 5 are displaced so as to close the main aperture 10. Thus, at $T_1$ the main aperture 10 is open to $f$-16 as indicated at G in FIG. 5.

A driving pulse generator circuit 38 includes the signal-generating gratings 17, light source 18 and photocell 19. As with the first embodiment the light from the light source 18 is intercepted for a short time by the photocell 19 as the shutter blades 4 and 5 are displaced in the opposite directions, so that a transistor 49 becomes conductive. Consequently, as indicated at F in FIG. 5 the voltage at the collector of the transistor 49 drops from H level to L level at $T_2$, whereby a monostable multivibrator 39 is triggered. That is, in response to the trigger pulse applied to an input terminal 50, the monostable multivibrator 39 is triggered so that its output derived from its output terminal 53 drops to L level for $\Delta T_H$ as indicated at D in FIG. 5. At $T_3$ the output from the monostable multivibrator 39 rises again to H level. From $T_1$ to $T_3$ the main aperture 10 remains $f$-16 as indicated at G in FIG. 5.

At $T_3$ the outputs from the first photometric circuit 37, second NAND gate 41 and monostable multivibrator 39 rise to H level again so that the second driving pulse is applied through the OR gate 47 to the driving circuit 21 as indicated at E in FIG. 5. Therefore, the main aperture 10 is opened to $f$-8 in the same manner as described above as indicated at G in FIG. 5.

As the shutter blades 4 and 5 are displaced one step, the driving pulse generator circuit 38 generates the trigger pulse in the manner described above at $T_4$, and in response to the second trigger pulse the monostable multivibrator 39 is triggered again, so that its output drops to L level and consequently the second driving pulse drops to L level as indicated at E in FIG. 5. In like manner, the driving pulses may be generated and applied to the driving circuit 21 so that the opening area of the main aperture may be sequentially increased stepwise. However, as described above, the output from the first photometric circuit 37 drops to L level at $T_5$ (that is, $\Delta T$ after $T_1$), so that the shutter opening mode is switched to the shutter closing mode. In other words, from $T_5$ no driving pulse is derived from the AND gate 46. Therefore, in response to two driving pulses shown at E in FIG. 5 the main aperture 10 is opened to and remained at $f$-8.

If the time constant $\Delta T$ of the first photometric circuit 37 becomes shorter in response to the brightness of the subject, only one driving pulse is derived. On the other hand, when the time constant $\Delta T$ becomes longer, three driving pulses are derived. Thus the opening area of the main aperture may be suitably selected depending upon the brightness of the subject. The second embodiment may be of course so modified that the number of *f*-numbers or apertures defined by the main aperture may be increased and that the opening area of the main aperture 10 may be more precisely defined.

In order to close the shutter, a second photometric circuit 54 including the auxiliary aperture 15 is provided. At $T_1$ the output Q from the first NAND gate 40 drops to L level so that a transistor 60 in the second photometric circuit 54 is turned off so that the charging of a timing capacitor 55 is started with the time constant depending upon the brightness of the subject; that is, the intensity of the light from the subject intercepted through the auxiliary aperture 15 by the photocell 16. The voltage across the timing capacitor 55 rises as indicated by the line L in FIG. 5, and when it reaches a threshold voltage J of a transistor 57, the latter becomes conductive. The time interval from $T_1$ to the time when the transistor 57 becomes conductive is $\Delta T_G$.

As the transistor 57 becomes conductive, a transistor 59 in a time-delay circuit 58 becomes conductive so that the charging of a time-delaying capacitor 61 is started. After $\Delta T_D$ the voltage across the time-delaying capacitor 61 reaches a threshold voltage of a transistor 56 so that the latter becomes conductive at $T_6$. That is, the time constant $\Delta T_G$ of the second photometric circuit 54 plus the time constant $\Delta T_D$ of the time-delaying circuit 58 after $T_1$, the transistor 56 becomes conductive, so that its output drops to L level. Consequently, the output from an inverter 62 rises to H level at $T_6$ as indicated at K in FIG. 5. This H level output signal is applied to one input terminal of an AND gate 63, while the output from the monostable multivibrator 39 is impressed to the other input terminal of the AND gate 63. At $T_6$ the output from the monostable multivibrator 39 is at H level so that the H level output from the AND gate 63 is transmitted through the OR gate 47 to the driving circuit 21. As a result, the step-motor 1 rotates one step in the opposite direction in which the main aperture 10 is closed to *f*-16 as indicated at G in FIG. 5.

As the shutter blades 4 and 5 are displaced one step toward their initial position, the trigger pulse is derived from the circuit 38 at $T_7$ in the manner described above, and is applied to the monostable multivibrator 39. As a result, at $T_7$ the driving pulse drops from H level to L level as indicated at L in FIG. 5. After $\Delta T_H$, that is, at $T_8$ the output from the monostable multivibrator 39 rises again to H level as indicated by D in FIG. 5 so that both inputs to the AND gate 63 are at H level. As a result, the H level or driving pulse is derived from the AND gate 63, and is applied to the driving circuit 21, so that the step-motor 1 rotates one step in the opposite direction and consequently the main aperture 10 is completely closed as indicated by G in FIG. 5.

As described above, the opening area of the auxiliary aperture 15 is varied in proportion to that of the main aperture 10 so that the quantity of the light from the subject to be intercepted by the photocell 16 may be suitably controlled. Therefore the time constant with which the timing capacitor 55 is charged may be varied in response to the brightness of the subject. That is, the second photometric circuit 54 is a circuit for determining a shutter speed in response to the brightness of the subject. In case of the aperture preselection type program-controlled shutters including those in accordance with the present invention, the time when the transistor 57 in the second photometric circuit; that is, the time constant of an integrator consisting of the photocell 16 and the timing capacitor 55 must be selected in response to the main aperture set. Therefore, it is possible to electrically change the operating timing of the circuit 54.

What is claimed is:
1. A program-controlled shutter comprising
   a. aperture setting means including a plurality of shutter blades adapted to be used as the aperture setting blades,
      a step-motor drivingly coupled to said plurality of shutter blades for displacing them stepwise, and a driving circuit adapted to control the rotation of said step-motor in response to the input driving pulse or pulses;
   b. shutter-blade-displacement detecting means for providing a series of output pulses each corresponding to an incremental motion of said shutter blades during the displacement of said shutter blades;
   c. driving pulse generating means adapted to generate said driving pulse or pulses to be applied to said step-motor in response to the output pulses from said shutter-blade-displacement detecting means; and
   d. photometric means for detecting the brightness of a subject and for generating a brightness detection signal corresponding to the amount of said brightness from said subject that passes through said shutter blades during the time when said shutter blades are so displaced to define an aperture and to generate a shutter closing signal to be applied to said driving circuit and said driving pulse generating means when the integrated value of the brightness detection signal reaches a predetermined level, whereby said shutter blades are displaced to define the optimum aperture depending upon the brightness of the subject and to close said aperture after a predetermined time depending upon the brightness of the subject, thereby attaining the optimum exposure.

2. A program-controlled shutter as set forth in claim 1 wherein said shutter-blade-displacement detecting means comprises
   a. gratings with a suitable number of equidistantly spaced apart slits cut in one of said shutter blades;
   b. light emitting means; and
   c. photocell means so positioned as to intercept the light from said light emitting means through the slits.

3. A program-controlled shutter as set forth in claim 1 wherein said shutter-blade-displacement detecting means comprises
   a. a plurality of permanent magnets attached on one of said shutter blades arranged in such a way that the opposite polarity poles may be alternately located in side-by-side relation; and
   b. detecting means so arranged as to detect the polarity of the pole brought in opposed relation therewith as said shutter blades are displaced.

4. A program-controlled shutter as set forth in claim 1 wherein said shutter-blade-displacement detecting means comprises
   a. a plurality of electrical contacts attached and arranged on one of said shutter blades in equidistantly spaced apart relation; and
   b. a wiper means so positioned as to make electrical contact with one of said electrical contacts as said shutter blades are displaced.

5. A program-controlled shutter as set forth in claim 1 wherein said photometric means comprises a. an auxiliary opening cut in through each of said shutter blades, as said shutter blades are displaced, the auxiliary openings of said shutter blades cooperate to define an auxiliary aperture whose opening area changes in proportion to the opening area of a main aperture defined by main openings each cut in through said shutter blades, b. photocell means so positioned as to intercept the light from a subject through said auxiliary aperture, c. a timing capacitor so electrically coupled to said photocell means that the light intercepted by said photocell means may be integrated in terms of a voltage charged across said timing capacitor, and d. electronic switching means electrically coupled to said timing capacitor in such a way that when the voltage across said timing capacitor reaches a predetermined level said switching means may be closed or conducted.

6. A program-controlled shutter as set forth in claim 5 wherein said photometric means further includes a. a time-delay circuit adapted to delay the impression of said shutter closing signal to said driving pulse generating means by a predetermined time behind the impression of said shutter closing signal to said driving circuit.

7. A program-controlled shutter comprising:

a. aperture setting means including a plurality of shutter blades adapted to be used also as the aperture setting blades, a step-motor drivingly coupled to said shutter blades for displacing them stepwise, and a driving circuit adapted to control the rotation of said step-motor in response to the input driving pulse or pulses;

b. shutter-blade-displacement detecting means adapted to detect the displacement of said shutter blades, said shutter-blade-displacement detecting means comprising i. a plurality of permanent magnets attached on one of said shutter blades and arrayed in such a way that the opposite polarity poles may be alternately located in side-by-side relation, and ii. detecting means so arranged as to detect the polarity of the pole brought in opposed relation therewith as said shutter blades are displaced;

c. driving pulse generating means adapted to generate said driving pulse or pulses to be applied to said step-motor in response to the output from said shutter-blade-displacement detecting means;

d. a first photometric circuit means adapted to detect the brightness of a subject and to actuate said driving pulse generating means for a period determined by the brightness detected and to generate the shutter opening pulse signal which is applied to said driving circuit for driving said step-motor in the direction in which said shutter blades define an aperture; and e. a second photometric circuit means adapted to detect the brightness of the subject and to provide a voltage corresponding to the amount of said brightness that passes through said aperture and to generate a signal when the detected brightness voltage reaches a predetermined level so that in response to said signal said driving pulse generating means is actuated to cause said step-motor to rotate in the direction in which said aperture defined by said shutter blades is closed, and to generate the shutter closing signal to be applied to said driving circuit, whereby the aperture may be set by said first photometric circuit means while the shutter opening time or shutter speed may be determined by said second photometric circuit means, thereby attaining the optimum exposure depending upon the brightness of the subject.

8. A program-controlled shutter comprising:

a. aperture setting means including a plurality of shutter blades adapted to be used also as the aperture setting blades, a step-motor drivingly coupled to said shutter blades for displacing them stepwise, and a driving circuit adapted to control the rotation of said step-motor in response to the input driving pulse or pulses;

b. shutter-blade-displacement detecting means adapted to detect the displacement of said shutter blades, said shutter-blade-displacement detecting means comprising i. a plurality of electrical contacts attached and arrayed on one of said shutter blades in equidistantly spaced apart relation, and ii. a wiper means so positioned as to make electrical contacts as said shutter blades are displaced;

c. driving pulse generating means adapted to generate said driving pulse or pulses to be applied to said step-motor in response to the output from said shutter-blade-displacement detecting means;

d. a first photometric circuit means adapted to detect the brightness of a subject and to actuate said driving pulse generating means for a period determined by the brightness detected and to generate the shutter opening pulse signal which is applied to said driving circuit for driving said step-motor in the direction in which said shutter blades define an aperture; and e. a second photometric circuit means adapted to detect the brightness of the subject and to provide a voltage corresponding to the amount of said brightness that passes through said aperture and to generate a signal when the detected brightness voltage reaches a predetermined level so that in response to said signal said driving pulse generating means is actuated to cause said step-motor to rotate in the direction in which said aperture defined by said shutter blades is closed, and to generate the shutter closing signal to be applied to said driving circuit, whereby the aperture may be set by said first photometric circuit means while the shutter opening time or shutter speed may be determined by said second photometric circuit means, thereby attaining the optimum exposure depending upon the brightness of of the subject.

9. A program-controlled shutter comprising:

a. aperture setting means including a plurality of shutter blades adapted to be used also as the aperture setting blades, a step-motor drivingly coupled to said shutter blades for displacing them stepwise, and a driving circuit adapted to control the rotation of said step-motor in response to the input driving pulse or pulses;

b. shutter-blade-displacement detecting means adapted to detect the displacement of said shutter blades, said shutter-blade-displacement detecting means comprising i. a grating with a suitable number of equidistantly spaced apart slits cut in through said shutter blades;

ii. light emitting means; and iii. photocell means so positioned as to intercept the light from said light emitting means through the slits;

c. driving pulse generating means adapted to generate said driving pulse or pulses to be applied to said step-motor in response to the output from said shutter-blade-displacement detecting means;

d. a first photometric circuit means adapted to detect the brightness of a subject and to actuate said driving pulse generating means for a period determined by the brightness detected and to generate the shutter opening pulse signal which is applied to said driving circuit for driving said step-motor in the direction in which said shutter blades define an aperture; and e. a second photometric circuit means adapted to detect the brightness of the subject and to provide a voltage corresponding to the amount of said brightness that passes through said aperture and to generate a signal when the detected brightness voltage reaches a predetermined level so that in response to said signal said driving pulse generating means is actuated to cause said step-motor to rotate in the direction in which said aperture defined by said shutter blades is closed, and to generate the shutter closing signal to be applied to said driving circuit, whereby the aperture may be set by said first photometric circuit means while the shutter opening time or shutter speed may be determined by said second photometric circuit means, thereby attaining the optimum exposure depending upon the brightness of the subject.

* * * * *